(12) United States Patent
Sosnowski et al.

(10) Patent No.: US 9,937,642 B2
(45) Date of Patent: Apr. 10, 2018

(54) CONSTRUCTION MATERIAL COMPOSITION AND METHOD OF FORMING CONSTRUCTION MATERIALS UTILIZING RICE HULLS

(71) Applicant: Remold Products, LLC.

(72) Inventors: Gerald Joseph Sosnowski, Whitmore Lake, MI (US); Gregory Arthur LeBlanc, Howell, MI (US)

( * ) Notice: Subject to any disclaimer, the term of this patent is extended or adjusted under 35 U.S.C. 154(b) by 230 days.

(21) Appl. No.: 14/602,202

(22) Filed: Jan. 21, 2015

(65) Prior Publication Data

US 2015/0329722 A1    Nov. 19, 2015

Related U.S. Application Data

(60) Provisional application No. 61/929,565, filed on Jan. 21, 2014.

(51) Int. Cl.

| | | |
|---|---|---|
| *B29C 35/02* | (2006.01) | |
| *B27N 1/02* | (2006.01) | |
| *B29C 65/48* | (2006.01) | |
| *B29C 67/24* | (2006.01) | |
| *C08L 75/04* | (2006.01) | |
| *C08L 97/00* | (2006.01) | |
| *C09J 175/04* | (2006.01) | |
| *C09J 197/00* | (2006.01) | |
| *E04C 2/24* | (2006.01) | |
| *C08L 97/02* | (2006.01) | |
| *B29L 7/00* | (2006.01) | |
| *B29L 9/00* | (2006.01) | |
| *B29L 31/00* | (2006.01) | |
| *B29L 31/10* | (2006.01) | |
| *B29K 71/00* | (2006.01) | |
| *B29K 75/00* | (2006.01) | |

(52) U.S. Cl.
CPC ........... *B29C 35/02* (2013.01); *B27N 1/02* (2013.01); *B29C 35/0222* (2013.01); *B29C 65/48* (2013.01); *B29C 67/24* (2013.01); *C08L 75/04* (2013.01); *C08L 97/00* (2013.01); *C08L 97/02* (2013.01); *C09J 175/04* (2013.01); *C09J 197/00* (2013.01); *E04C 2/243* (2013.01); *E04C 2/246* (2013.01); *B27N 1/0218* (2013.01); *B29K 2071/00* (2013.01); *B29K 2075/00* (2013.01); *B29L 2007/002* (2013.01); *B29L 2009/006* (2013.01); *B29L 2031/10* (2013.01); *B29L 2031/724* (2013.01); *B29L 2031/737* (2013.01); *B29L 2031/776* (2013.01); *C08G 2170/80* (2013.01)

(58) Field of Classification Search
CPC ..... B29C 35/02; B29C 35/0222; B29C 65/48; B29C 67/24; B27N 1/02; C08L 75/04; C08L 97/00; C08L 97/02; C09J 175/04; C09J 197/00; E04C 2/243; E04C 2/246
USPC .......................................................... 524/15
See application file for complete search history.

(56) References Cited

U.S. PATENT DOCUMENTS

| | | | | |
|---|---|---|---|---|
| 3,930,089 A | * | 12/1975 | Vasishth | C08L 97/02 156/62.2 |
| 6,187,249 B1 | * | 2/2001 | Lewellin | B27N 3/02 264/109 |

FOREIGN PATENT DOCUMENTS

| | | | | | |
|---|---|---|---|---|---|
| CN | 102617821 A | * | 8/2012 | | |
| KR | 1020020075820 A | * | 10/2002 | ............. | B29B 17/00 |

* cited by examiner

*Primary Examiner* — Ling Choi
*Assistant Examiner* — Ronald Grinsted
(74) *Attorney, Agent, or Firm* — Pearne & Gordon LLP (57) ABSTRACT

Provided are a structure and a method of forming a structure that includes a core made, at least in part, of a rice hull composition. The rice hull composition including a combination of separate, unground rice hulls; ground rice hulls; and a rice hull powder, that each have a different particle size. A caustic-free polyurethane resin binds the separated unground rice hulls, the ground rice hulls and the rice hull powder together.

10 Claims, 7 Drawing Sheets

CONSTRUCTION MATERIAL COMPOSITION AND METHOD OF FORMING CONSTRUCTION MATERIALS UTILIZING RICE HULLS

CROSS-REFERENCE TO RELATED APPLICATIONS

This application claims the benefit of U.S. Provisional Application No. 61/929,565, filed Jan. 21, 2014, which is incorporated in its entirety herein by reference.

BACKGROUND OF THE INVENTION

1. Field of the Invention

This application relates generally to a method and apparatus involving rice hulls and, more specifically, to construction panels and other materials formed at least in part of rice hulls and a method of manufacturing construction panels and other materials.

2. Description of Related Art

It is estimated that millions of tons of rice hulls are generated as a byproduct of processing rough rice for consumption throughout the world. These rice hulls are made of materials that are very durable and can be difficult to recycle or otherwise dispose of. As a result, rice processors are often willing to give the rice halls to anyone willing to take them free of charge.

BRIEF SUMMARY OF THE INVENTION

According to one aspect, the subject application involves method of forming a structure including rice hulls. The method includes combining separated rice hulls, ground rice hulls and a rice hull powder that each have a different average particle size. A binder is used to bind the separated rice hulls, the ground rice hulls and the rice hull powder together to form a rice hull composition. The binder includes a caustic-free urethane-based resin. The rice hull composition is introduced to a mold having a cavity that defines a desired shape of the structure to be produced, and is heated within the mold to initiate curing of the binder and initially fix the desired shape of the structure within the mold. After heating the rice hull composition and initiating curing of the binder, the rice hull composition is removed from the mold before the binder has fully cured. After removing the rice hull composition from the mold, the method includes further curing the binder to a desired degree of completion, optionally complete curing.

According to another aspect, the subject application involves a building structure that includes a core formed, at least in part, from a rice hull composition. The rice hull composition includes a combination of separate unground rice hulls, ground rice hulls and a rice hull powder that each have a different average particle size. The core also includes a caustic-free polyurethane resin that binds the separated unground rice hulls, the ground rice hulls and the rice hull powder together.

The above summary presents a simplified summary in order to provide a basic understanding of some aspects of the systems and/or methods discussed herein. This summary is not an extensive overview of the systems and/or methods discussed herein. It is not intended to identify key/critical elements or to delineate the scope of such systems and/or methods. Its sole purpose is to present some concepts in a simplified form as a prelude to the more detailed description that is presented later.

BRIEF DESCRIPTION OF SEVERAL VIEWS OF THE DRAWING

The invention may take physical form in certain parts and arrangement of parts, embodiments of which will be described in detail in this specification and illustrated in the accompanying drawings which form a part hereof and wherein.

DETAILED DESCRIPTION OF THE INVENTION

Certain terminology is used herein for convenience only and is not to be taken as a limitation on the present invention. Relative language used herein is best understood with reference to the drawings, in which like numerals are used to identify like or similar items. Further, in the drawings, certain features may be shown in somewhat schematic form.

It is also to be noted that the phrase "at least one of", if used herein, followed by a plurality of members herein means one of the members, or a combination of more than one of the members. For example, the phrase "at least one of a first widget and a second widget" means in the present application: the first widget, the second widget, or the first widget and the second widget. Likewise, "at least one of a first widget, a second widget and a third widget" means in the present application: the first widget, the second widget, the third widget, the first widget and the second widget, the first widget and the third widget, the second widget and the third widget, or the first widget and the second widget and the third widget.

Mounting pressure on the construction industry to conserve products comprised of natural wood as well as the failure of traditional building materials to meet the evolving performance requirements of the market place has driven the investigation of new materials and manufacturing processes to develop such materials for use in the construction industry. The utilization of rice hulls in such construction materials offers the opportunity to recycle industrial by-product waste while providing a product such as construction panels, for example, with desirable insulating qualities, resistance to burning, ease of installation, resistance to insects, and enhanced strength relative to conventional building materials such as natural wood.

A matrix of resin, adhesives, rice hulls and optionally ground particles and/or reinforcing fibers are compression molded into a desired shape with heat to form panels having a core with desired and varying shapes, dimensions, forms and features. The resulting items created can have at least one of the following attributes; resistance to moisture, fire, insects while providing structural strength against racking and shear forces. Items also provide quality characteristics including; thermal insulation, sound deadening, strength to resist bending force and become a stable substrate to support composite coatings, veneers and integral structural members (such as wood rails and stiles). Items can be constructed to form interlocking components that form a monolithic structure such as wall sections and corners, for example. Of course any desired construction paneling or other object can be formed, including, ceiling tiles, doors, etc. . . .

Figure 1:
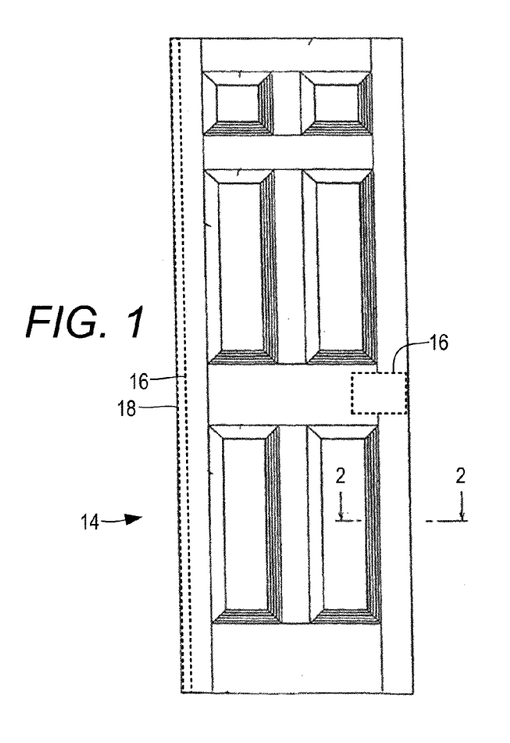
FIG. 1 shows an illustrative example of a door comprising a core formed from a rice hull composition.

FIG. 1 of the present application shows an embodiment of a door 14 comprising a core 10 (FIG. 2) formed, at least in part, from a rice hull composition. Embedded in the core 10, can optionally be one or more hardware mounting substrates 16 (shown in broken lines in FIG. 1) fabricated from wood, a synthetic plastic material, metal, or any other material with sufficient rigidity and strength to withstand the forces commonly exerted on such hardware. For example, the hardware mounting substrates 16 in FIG. 1 include a substrate arranged at a location where a door handle and/or locking mechanism is to be installed, as well as one or more substrates along the hinged side 18 of the door 14 for mounting hinge plates using threaded fasteners such as screws, for example.

Figure 2:
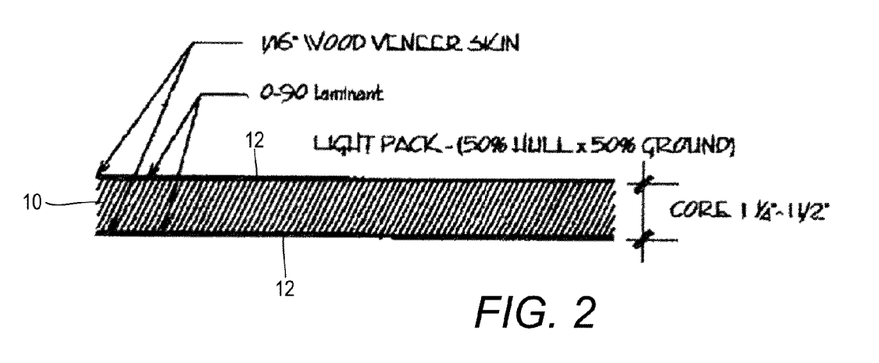
FIG. 2 shows a cross-sectional view of the illustrative example of the door 14 taken along line 2-2 in FIG. 1.

FIG. 2 shows a cross-sectional view of the illustrative example of the door 14 taken along line 2-2 in FIG. 1. The door 14 includes a core 10 formed, at least in part, from a rice hull composition, optionally in combination with other building materials such as a binder, pigment or other coloring agent, and externally-exposed coating. In FIG. 2, the other building material includes a wood veneer skin 12 adhesively applied to opposite exposed surfaces of the core 10. The wood veneer thus provides the door 14 with the external appearance of wood, while the core 10 provides the door 14 with the structural properties described herein.

Figure 3:
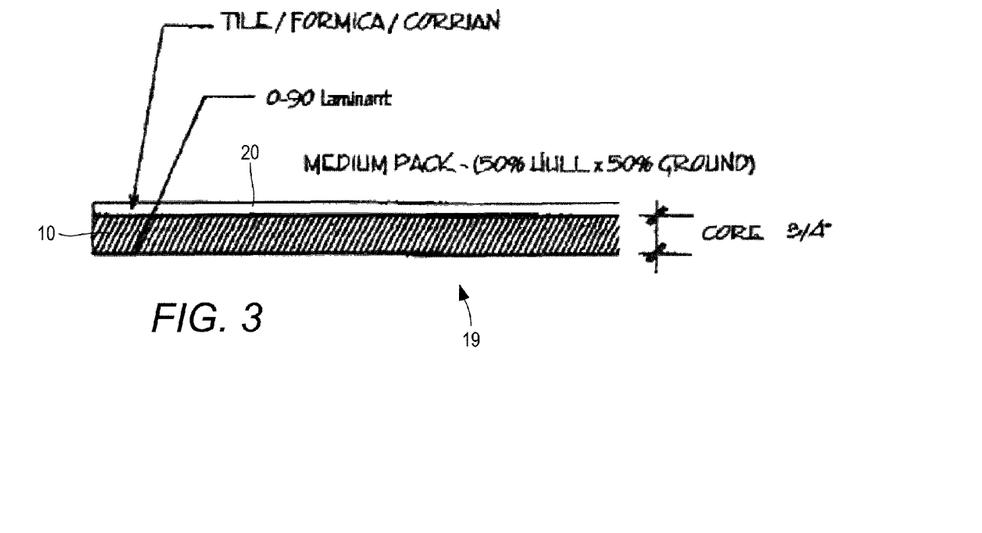
FIG. 3 shows a sectional view of a countertop comprising a core formed at least in part from a rice hull composition.

Although shown and described herein as a door 14 for the sake of brevity and clarity, the construction panel of the present application can be formed as any desired construction material that includes the core 10, such as a countertop 19, a cross-section of which is shown in FIG. 3. For example, rather than the wood veneer 12 shown in FIG. 2, a countertop material 20 (e.g., granite, marble, other tile, formica, Corian®, etc. . . . ), reinforcing structures, and the like can be provided to the core 10 to form an externally-exposed countertop surface.

Figure 4:
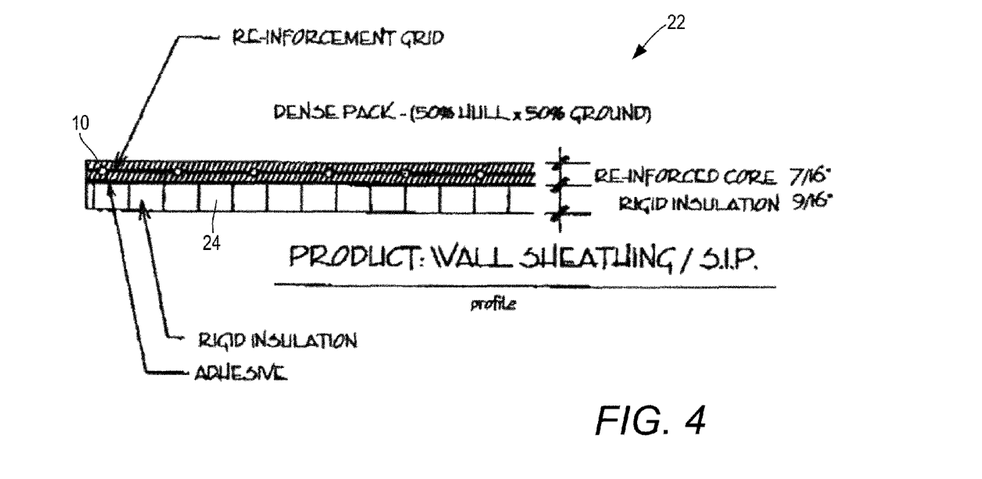
FIG. 4 shows a sectional view of a structural insulated panel comprising a single core formed at least in part from a rice hull composition.
Figure 5:
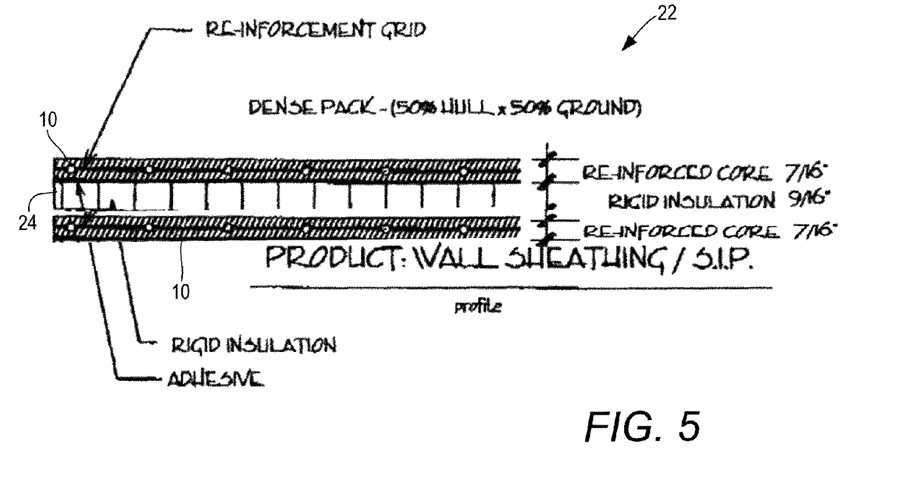
FIG. 5 shows a sectional view of a structural insulated panel comprising insulation sandwiched between opposing cores, each of which being formed at least in part from a rice hull composition.

As another example, a cross-sectional view of an embodiment of the construction panel in the form of insulated wall sheathing or structural insulated panel ("SIP") 22 utilizing the core 10 comprising the rice hull composition. As shown, the SIP 22 includes the core 10 adhered against a rigid layer of insulation 24 such as foamed polystyrene, for example. Alternate embodiments of the SIP 22 can include the SIP 22 can be manufactured under factory controlled conditions and can be structurally configured to fit nearly any building design. Although only a single layer of the core 10 is shown in FIG. 4, other embodiments of the SIP 22 can include a second layer of the core 10 arranged on an opposite side of the insulation 24 relative to the core 10 shown in FIG. 4. In other words, the insulation 24 can optionally be sandwiched between opposing cores 10 as shown in FIG. 5.

Figure 6:
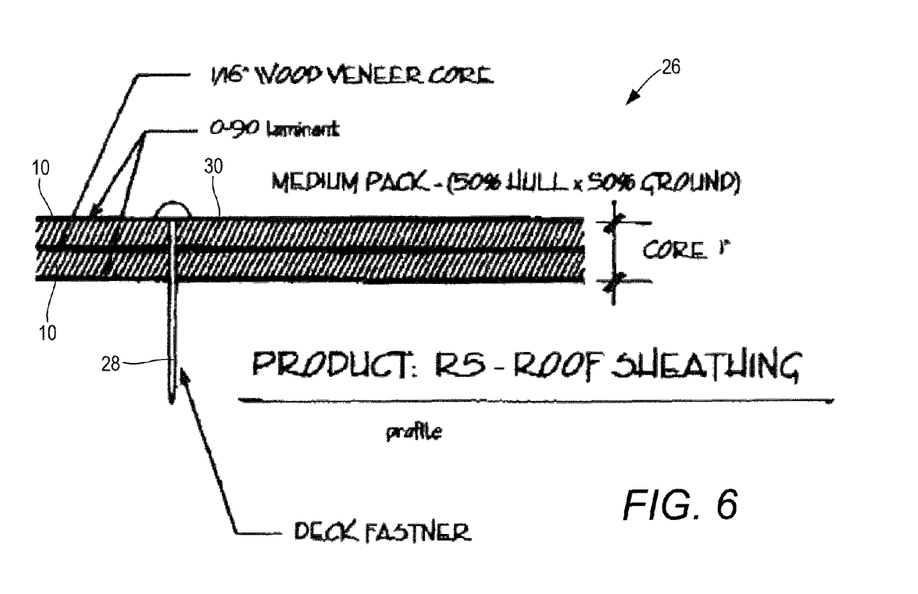
FIG. 6 shows a sectional view of a roof panel 26 including a plurality of stacked cores formed at least in part from the rice hull composition described herein.

FIG. 6 shows another illustrative embodiment of the construction panel in the form of a roof panel 26 including a plurality of stacked cores 10 formed at least in part from the rice hull composition described herein. The stacked cores 10 are coupled together, and to an underlying frame such as a truss or floor joists, for example, by a nail 28 or other suitable mechanical fastener driven through the cores 10. A laminate, veneer 30, or other suitable coating material can optionally be applied to the externally-exposed surface of the stack of cores 10.

The core 10 described herein comprises a rice hull composition that includes a rice hull composition formed from at least one of, and optionally a combination of two or more of: separate unground rice hulls, ground rice hulls and a rice hull powder. Each of the separated unground rice hulls, the ground rice hulls and the rice hull powder comprises a different particle size, with the unground rice hulls having the largest particle size, and the rice hull powder having the smallest particle size. The ground rice hulls, with an intermediate particle size, can optionally be ground to a 16/80 mesh. According to a specific embodiment, the rice hull composition can include at least the unground rice hulls and the ground rice hulls.

A caustic-free polyurethane resin thermosetting binder can be combined with the rice hull composition to bind the separated unground rice hulls, the ground rice hulls and the rice hull powder together. For example, the binder can be a thermosetting material such as an aliphatic polyurethane resin, optionally with a UV resistant component added to resist discoloration as a result of exposure to ultraviolet light. The UV resistant material can also optionally protect the coloring agent against degradation by blocking at least a portion of ultraviolet light impinging on the core 10.

In addition to the rice hull composition and the binder, the material forming the core 10 can also optionally include crumb rubber, which is particular rubber derived from grinding, chopping, crushing or otherwise breaking apart recycled tires. The crumb rubber included in the material forming the core 10 can have an average particle size of approximately four one-thousandths (0.004 in.) of an inch or less.

Figure 7:
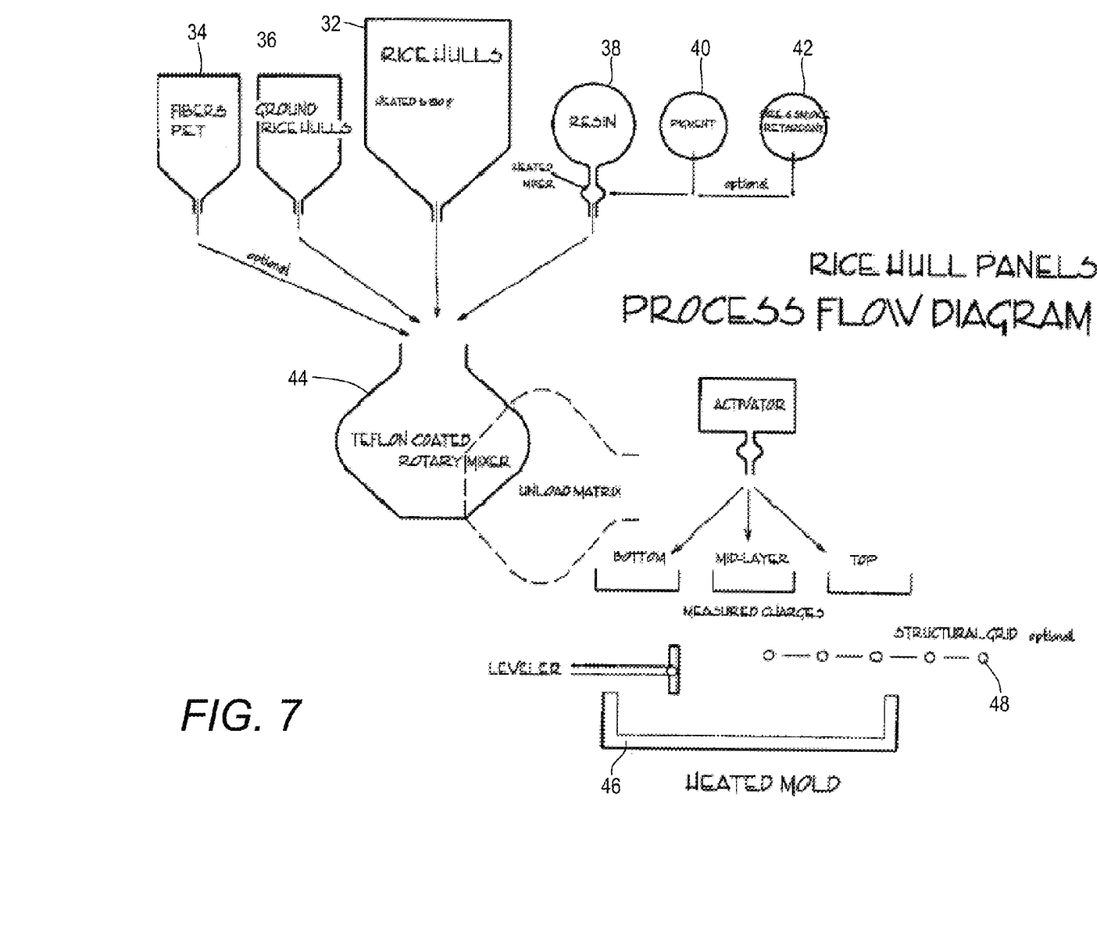
FIG. 7 schematically depicts an illustrative manufacturing assembly for manufacturing the cores described herein.

A manufacturing assembly for manufacturing the core 10 is schematically illustrated in FIG. 7. Raw rice hulls 32 are heated to any temperature within the range from approximately 150° F. to approximately 500° F., (e.g., 150° F. for the present embodiment), and combined with at least one of: polymeric fibers 34 such as polyethylene terephthalate ("PET"), the ground rice hulls 36, the rice hull powder, the heated binder 38, a pigment 40 for providing the end product with a desired color, and optional fire and/or smoke retardant material 42. This combination can optionally be introduced to a rotary mixer 44 to promote complete coverage of all of the rice hull particulates with the binder 38. The selected components are mixed, and subsequently dispensed into the appropriate mold 46 for the panel under construction. The quantities dispensed can be specifically-measured quantities, and can optionally be included on, or surround a structural re-enforcement such as a reinforcing mesh 48 in the heated mold 46.

Figure 8:
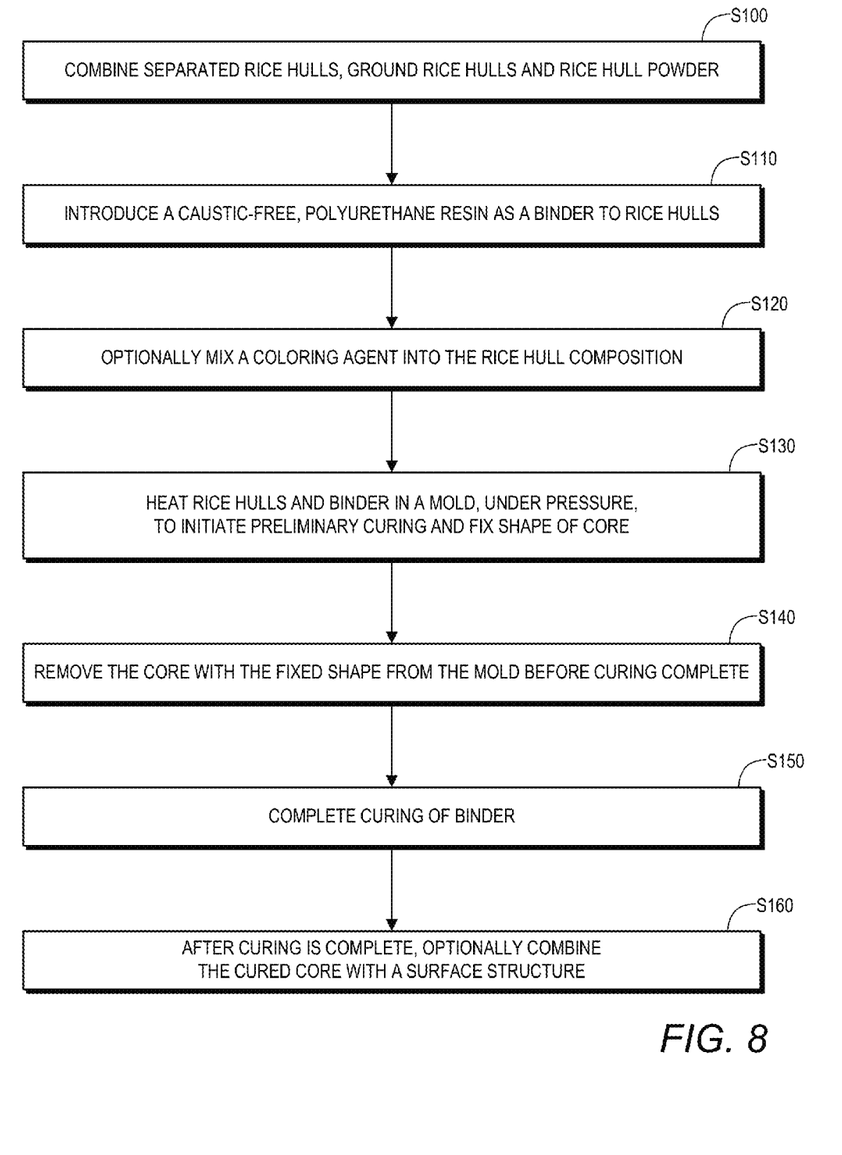
FIG. 8 is a flow diagram schematically depicting a method of forming a core.

A more detailed description of the method of forming a core 10 comprising rice hulls is described with reference to the flow diagram of FIG. 8. According to such a method, the separated rice hulls, ground rice hulls and the rice hull powder, each having a different (and progressively smaller) particle size, are combined at step S100. The combination of each type of rice hull material can take place in the mixer 44 shown in FIG. 7. The binder 38 is introduced to the mixer 44 to bind the separated rice hulls, the ground rice hulls and the rice hull powder together to form the rice hull composition at step S110, as is the optional coloring agent at step S120. The mixture including the rice hull composition is then introduced, at step S130, to the heated mold 46 having a cavity that defines the desired shape of the structure to be produced.

While in the mold 46, the rice hull mixture can be exposed to a temperature within a range from approximately two hundred (200° F.) degrees Fahrenheit to approximately two hundred eighty (280° F.) degrees Fahrenheit, and optionally within a range from approximately two hundred forty (240° F.) degrees Fahrenheit to approximately two hundred fifty (250° F.) degrees Fahrenheit. However, according to other embodiments, the rice hull composition within the mold can be heated in an environment having any temperature within a range from approximately one hundred fifty (150° F.) degrees Fahrenheit to approximately five hundred (500° F.) degrees Fahrenheit without departing from the scope of the present disclosure. The rice hull mixture in the mold 46 can also be subjected to a molding pressure within a range from approximately two hundred (200 psi) pounds per square inch to approximately two thousand (2,000 psi) pounds per square inch. Exposure of the rice hull composition to the elevated temperature and pressure can continue for a time within a range from approximately two (2 min.) minutes to approximately six (6 min.) minutes, depending on the size of the core 10 being manufactured.

The heat from the mold or other heat source at step S130 initiates curing of the thermosetting binder to initially fix the shape of the rice hull composition in the shape of the mold 46. However, before the binder has fully cured, the rice hull composition is removed from the mold at step S140, to be subsequently subjected to another elevated temperature to complete curing of the binder externally of the mold 46 at step S150. Once the rice hull composition has been fully cured, the rice hull composition can be combined with an exposed surface structure such as the wood veneer or countertop surface, for example, or other material described herein at step S160. Examples of other suitable surface structure materials include, but are not limited to, at least one of: a re-enforced polyethylene terephthalate; a substantially-transparent polyurethane coating; and a waterborne acrylic urethane material.

The resulting core 10 can possess characteristics desirable in the field of construction. For instance, a moisture test conducted on such a panel required the panel to be fully submerged in water at room temperature for four (4 mos.) months. The panel exhibited less than a five (5%) percent weight gain over the duration of the test. The weight gain was approximately four (4%) percent, by mass. The rate at which the panel gained water weight also appeared to slow over time. Of the approximately four (4%) percent weight gain realized over the four month span, the panel exhibited an approximately three (3%) percent weight gain during the first week of the test.

Figure 9:
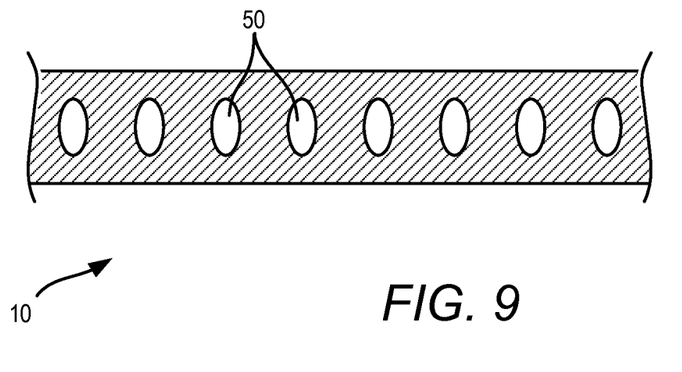
FIG. 9 is a sectional view of a portion of a hollow core comprising a plurality of air-filled apertures or pockets.

The core 10 formed from the rice hull composition can be formed as a solid object, or optionally as defining a plurality of air-filled apertures 50 or pockets as shown in FIG. 9. Although the apertures 50 are shown in a linear arrangement in FIG. 9, any desired pattern of apertures 50 can optionally be adopted. For example, another embodiment of the core 10 can optionally include a honeycomb arrangement of apertures 50 without departing from the scope of the present disclosure.

Figure 10:
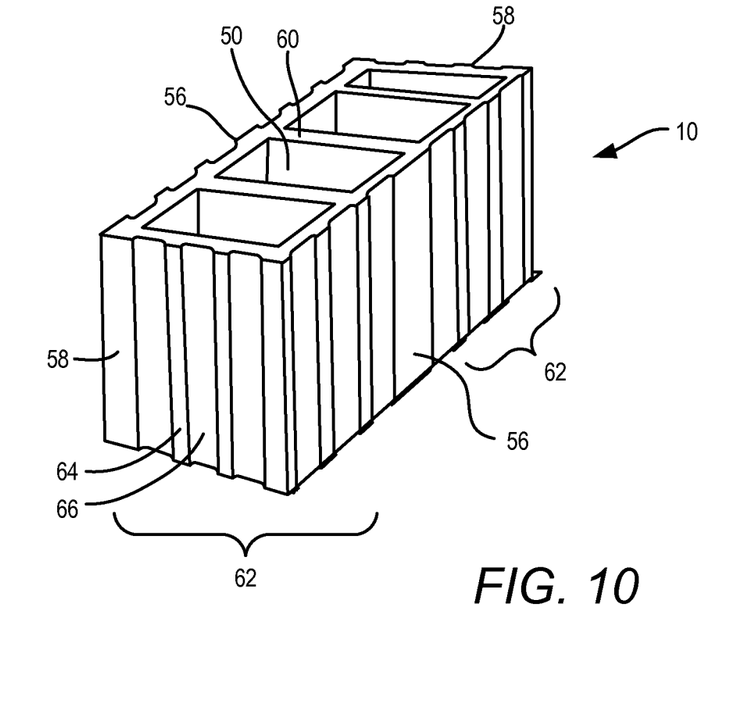
FIG. 10 shows another embodiment of a core molded into the shape of a building block.

Also, rather than being formed in a planar shape as a plank, the core can be molded into any desired shape. Another embodiment of the core 10 including air-filled voids is illustrated in FIG. 10, and forms a building block that can be assembled adjacent to a plurality of other such blocks to construct a foundational wall for example. As shown in FIG. 10, the core 10 includes parallel and opposing planar side walls 56 separated by air-filled apertures 50 established during the molding process. Similarly, parallel and opposing end walls 58 are integrally formed as monolithic structures with the side walls 56 on opposite longitudinal ends of the block-shaped core 10. One, or a plurality of transverse partitions 60 can be formed between the end walls 58 to establish a plurality of apertures 50.

The external surface of each core 10 within a region adjacent to one or both end walls 58 can optionally include an alignment feature 62. The alignment feature 62 of each core 10 is cooperable with a similar alignment feature provided to an abutting core arranged adjacent to the core 10 as part of an assembly. Cooperation between the alignment feature can establish a substantially-linear arrangement of the abutting cores 10, or a substantially-perpendicular arrangement, for example. In the embodiment appearing in FIG. 10, the alignment feature 62 includes vertical spines 64 separated by vertical troughs 66. The spines 64 and troughs 66 on each core can be configured such that the spines 64 of a first core 10 are received in the troughs 66 of the adjacent core provided to the end wall 58 to promote a linear arrangement of those cores 10. Similarly, spines 64 and troughs 66 on each core can be configured such that the spines 64 provided to the end wall 58 of a first core are received in the troughs 66 of the adjacent core provided to the side wall 56 to promote a perpendicular arrangement of those cores 10, thereby forming a corner.

Figure 11:
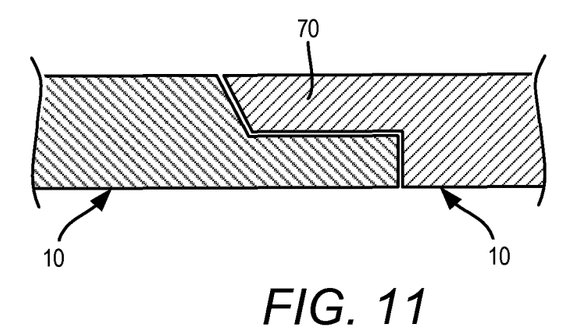
FIG. 11 shows an edge-alignment feature provided to plank-shaped cores to establish proper alignment of laterally-aligned cores.

In addition to the block-shaped cores 10, the cores 10 formed as planks can also include alignment features for being joined with neighboring planks. For example, each plank formed of the rice hull composition described herein can include an overhang 70 along one longitudinal edge of the plank, as schematically shown in FIG. 11. For the plank on the right in FIG. 11, the overhang extends laterally outward from an upper region of the plank. A similarly-configured core 10, on the left in FIG. 11, is oriented so the overhang 70 extends laterally outward from the lower region of the plank and arranged such that the overhangs 70 of each plank overlap to form a lap joint. Although the overhangs 70 in FIG. 11 extend from the upper or lower region of the plank, depending on the plank's orientation, other embodiments can utilize a tongue and groove configuration. For such embodiments, the tongue extending along one lateral side of the plank is adapted to be received in a trough formed in the opposite lateral side of an adjacent plank, again ensuring proper alignment of the adjacent planks.

Figure 12:
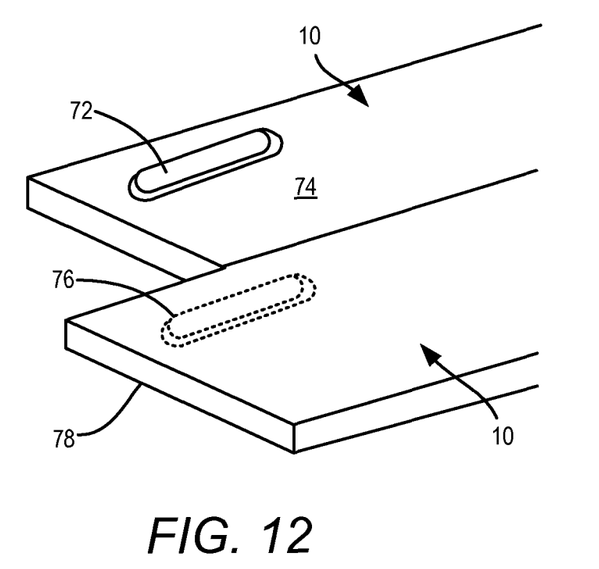
FIG. 12 shows another alignment feature provided to plank-shaped cores to establish proper alignment of overlapping cores.

Another embodiment of the alignment feature provided to plank-shaped cores 10 is shown in FIG. 12 as a keyed joint. As shown, each plank includes a protrusion 72 from an upward-facing major surface 74 and a similarly-located recess 76 (shown using hidden lines) formed in a downward-facing major surface 78. Planks placed on top of each other can be properly aligned through cooperation of the protrusion 72 and the recess 74 formed in the overlaid plank.

Regardless of their physical shape, the resulting cores can have the following properties:

Densities as low as 20 lbs. per cubic foot and as high as 108 lbs. per cubic foot;

Thermal resistance with an R-value of 1.7 for a 1.66 inch thick plank;

Ballistic resistance—1.25 in. thick planks were shot with a .22-cal. Bullet at a range of 6". The projectile entered the core of rice hull composition shaped as a plank, but did not exit the plank.

In addition to the moisture resistance, the construction panels described herein also exhibit desirable mechanical characteristics and durability. For example, the experimental results outlined below reflect the tear strength of various samples.

EXPERIMENTAL I

TABLE 1

Tear Strength of Example 1

|   | Thickness (in.) | Tear Strength (lbs/in.) |
|---|---|---|
| 1 | 0.197 | 202.073 |
| 2 | 0.197 | 160.501 |
| 3 | 0.185 | 247.145 |
| 4 | 0.205 | 273.378 |
| 5 | 0.197 | 300.203 |
| Mean | 0.196 | 236.660 |
| Standard Deviation (SD) | 0.007 | 55.885 |
| Mean + 2SD | 0.210 | 348.429 |
| Mean − 2SD | 0.182 | 124.890 |

EXPERIMENTAL II

TABLE 2

Tear Strength of Example 2

|   | Thickness (in.) | Tear Strength (lbs/in.) |
|---|---|---|
| 1 | 0.207 | 498.902 |
| 2 | 0.207 | 184.732 |
| 3 | 0.039 | 2000.148 |
| 4 | 0.197 | 272.502 |
| 5 | 0.181 | 236.804 |
| Mean | 0.166 | 638.618 |
| Standard Deviation (SD) | 0.072 | 770.518 |
| Mean + 2SD | 0.309 | 2179.654 |
| Mean − 2SD | 0.023 | −902.419 |

EXPERIMENTAL III

TABLE 3

Tear Strength of Example 3

|   | Thickness (in.) | Tear Strength (lbs/in.) |
|---|---|---|
| 1 | 0.039 | 609.885 |
| 2 | 0.177 | 58.854 |
| 3 | 0.197 | 138.578 |
| 4 | 0.197 | 160.870 |
| 5 | 0.177 | 109.288 |
| Mean | 0.157 | 215.495 |

TABLE 3-continued

Tear Strength of Example 3

|   | Thickness (in.) | Tear Strength (lbs/in.) |
|---|---|---|
| Standard Deviation (SD) | 0.067 | 223.752 |
| Mean + 2SD | 0.291 | 662.999 |
| Mean − 2SD | 0.024 | −232.009 |

EXPERIMENTAL IV

TABLE 4

Tear Strength of Example 4

|   | Thickness (in.) | Tear Strength (lbs/in.) |
|---|---|---|
| 1 | 0.197 | 184.728 |
| 2 | 0.197 | 149.045 |
| 3 | 0.217 | 434.020 |
| 4 | 0.197 | 384.482 |
| 5 | 0.217 | 514.219 |
| Mean | 0.205 | 333.299 |
| Standard Deviation (SD) | 0.011 | 159.311 |
| Mean + 2SD | 0.226 | 651.920 |
| Mean − 2SD | 0.183 | 14.678 |

EXPERIMENTAL V

TABLE 5

Tear Strength of Example 5

|   | Thickness (in.) | Tear Strength (lbs/in.) |
|---|---|---|
| 1 | 0.201 | 928.718 |
| 2 | 0.205 | 1174.824 |
| 3 | 0.197 | 508.455 |
| 4 | 0.197 | 752.462 |
| 5 | 0.187 | 536.348 |
| Mean | 0.197 | 780.161 |
| Standard Deviation (SD) | 0.007 | 279.224 |
| Mean + 2SD | 0.210 | 1338.609 |
| Mean − 2SD | 0.184 | 221.713 |

EXPERIMENTAL VI

TABLE 6

Tear Strength of Example 6

|   | Thickness (in.) | Tear Strength (lbs/in.) |
|---|---|---|
| 1 | 0.226 | 944.090 |
| 2 | 0.226 | 570.524 |
| 3 | 0.197 | 397.608 |
| 4 | 0.205 | 235.871 |
| 5 | 0.205 | 402.784 |
| Mean | 0.212 | 510.176 |
| Standard Deviation (SD) | 0.014 | 269.894 |

TABLE 6-continued

Tear Strength of Example 6

|  | Thickness (in.) | Tear Strength (lbs/in.) |
|---|---|---|
| Mean + 2SD | 0.239 | 1049.963 |
| Mean − 2SD | 0.184 | −29.612 |

Illustrative embodiments have been described, hereinabove. It will be apparent to those skilled in the art that the above devices and methods may incorporate changes and modifications without departing from the general scope of this invention. It is intended to include all such modifications and alterations within the scope of the present invention. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A structure comprising: a core comprising a rice hull composition formed from a combination of separate unground rice hulls, ground rice hulls and a rice hull powder, wherein the separated unground rice hulls, the ground rice hulls and the rice hull powder each comprises a different particle size; and a caustic-free polyurethane resin that binds the separated unground rice hulls, the ground rice hulls and the rice hull powder together.

2. The structure of claim 1 further comprising a coloring agent distributed throughout the rice hull composition.

3. The structure of claim 1 further comprising crumb rubber having an average particle size of approximately four one-thousandths (0.004 in.) of an inch or less combined with the rice hull composition.

4. The structure of claim 1 further comprising an externally-exposed surface comprising at least one of: a reinforced polyethylene terephthalate; a substantially-transparent polyurethane coating; and a waterborne acrylic urethane material.

5. The structure of claim 1 further comprising a reinforcing structure embedded within the rice hull composition of the core.

6. The structure of claim 1, wherein the core comprises a plurality of joined segments, and each of the joined segments comprises the core comprising the rice hull composition.

7. The structure of claim 1, wherein the core comprises a network of air-filled voids.

8. The structure of claim 7, wherein each of the air-filled voids is open to an ambient environment.

9. The structure of claim 7, wherein the core comprises an end region, and an externally-exposed surface of the core comprises an alignment feature arranged adjacent to a terminal edge of the core, the alignment feature being cooperable with an alignment feature provided to an abutting core arranged adjacent to the core as part of an assembly.

10. The structure of claim 1 having a density of between 20 lbs. per cubic foot to 108lbs. per cubic foot.

* * * * *